United States Patent [19]

Jones et al.

[11] 3,992,348

[45] Nov. 16, 1976

[54] METHOD FOR THE PREPARATION OF MOLDABLE FILLED POLYMETAL ACRYLATE

[75] Inventors: John F. Jones; Bernard Dubrow, both of Torrance, Calif.

[73] Assignee: TRW Systems and Energy, Redondo Beach, Calif.

[22] Filed: Sept. 21, 1970

[21] Appl. No.: 74,179

[52] U.S. Cl. .................. 260/30.6 R; 260/17.4 UC; 260/17.4 CL; 260/31.8 R; 260/31.8 M; 260/32.2; 260/42.21; 260/42.53; 260/857 R; 260/857 G; 260/873; 260/879; 260/884; 260/885
[51] Int. Cl.² .................... C08J 3/18; C08J 3/20; C08K 3/26; C08K 5/51
[58] Field of Search .............. 260/40 P, 80 P, 80 M, 260/41 R, 42.53, 30.6 R, 31.8 R, 31.8 M, 32.2

[56] References Cited

UNITED STATES PATENTS

| | | | |
|---|---|---|---|
| 2,833,745 | 5/1958 | Fikentscher | 260/80 P |
| 3,057,826 | 10/1962 | Griffing | 260/40 P |
| 3,264,272 | 8/1966 | Rees | 260/78.5 |
| 3,404,134 | 10/1968 | Rees | 260/78.5 |
| 3,405,106 | 10/1968 | Scanley | 260/80 M |
| 3,448,073 | 6/1969 | McMauimie | 260/879 |
| 3,455,871 | 7/1969 | Coover | 260/41 R |
| 3,546,158 | 12/1970 | Champion et al. | 260/41 R |
| 3,694,403 | 8/1972 | Aishima | 260/41 R |

*Primary Examiner*—Allan Lieberman
*Attorney, Agent, or Firm*—Daniel T. Anderson; Alan D. Akers

[57] ABSTRACT

Polymetal acrylates, permanently filled with an excess of a polyvalent metal carbonate and saturated with water, exhibit properties ranging from moldable elastomers to moldable clays. Polyvalent metal carbonates may be selected from zinc carbonate, cadmium carbonate, cobalt carbonate, calcium carbonate, magnesium carbonate, strontium carbonate, barium carbonate, copper carbonate, lead carbonate, nickel carbonate, iron carbonate, and manganese carbonate. Water, or water and water miscible organic liquids (such as alcohols or ketones which are plasticizers for the polymer) provide flexible compounds with integrity, while removal of the liquid provides hard plaster-like compounds. Rewetting the compounds provides the original maleable properties.

5 Claims, No Drawings

METHOD FOR THE PREPARATION OF MOLDABLE FILLED POLYMETAL ACRYLATE

Filled metal acrylates have been employed for molded bodies having good electrical properties and good resistance to relatively high temperatures. U.S. Pat. No. 2,401,348 discloses lead, barium, strontium, or ammonium acrylates or methacrylates mixed with clay to produce a molding composition. Heat and high pressure are applied to the dry composition to form molded articles.

In addition to molding compounds, the metal acrylates have been employed for soil stabilization or drilling muds. U.S. Pat. Nos. 2,552,775 and 2,651,619 suggest a possible reaction between metal acrylates and soil particles to increase the viscosity of a mud slurry and to provide a load bearing material upon the removal of water.

It has now been discovered that a novel molding compound can be made from metal acrylates or metal substituted acrylates which are permanently filled with an excess of the metal salt used in the formation of the metal acrylate or metal substituted acrylate. Briefly, it has been discovered that moldable elastomers or clays can be produced by polymerizing monomeric acrylic acid in the presence of an excess of a polyvalent metal carbonate. Incorporation of the fillers by this means allows the fillers to reinforce the polymer as well as to act as a passive filler, whereas fillers incorporated into acrylic acid after polymerization fail to become properly wetted and produce a product which tends to crumble readily. Properties of the moldable water saturated acrylate, according to this invention, vary from elastomeric for low filler loadings to clays for higher filler loadings.

The elastomeric shape is resistant to mechanical deformation in the wet state. The shape is maintained on evaporation of water with a resulting hardening of the material. Resoftening and rehardening may be accomplished many times with maintenance of the shape. The clay-like consistency material may also be hardened and softened many times by wetting and drying, but the shape will not be maintained thus allowing preservation of a desired shape in the hard, dry form or remolding in the soft, wet form.

The process by which the moldable acrylates are produced requires a minimum of equipment and technical skill. Monomeric acrylic or substituted acrylic acid is added to a stirring slurry of excess polyvalent metal carbonate at room temperature. The mixture is heated to the boiling point during which time the metal polyacrylate monomer is formed on the surface of the filler particles while the stirring is continued. After the boiling point has been reached, a free radical catalyst is added to the mixture and the stirring is continued for several minutes thereafter to permit the catalyst to become thoroughly mixed and the metal polyacrylate monomer to polymerize. Subsequently, when the stirring is stopped, the mixture is permitted to cool naturally or by the addition of cold water poured directly into the mixture. As the mixture cools, particles of the filled acrylate polymer coalesce and precipitate to the bottom. The particles can be removed by decanting the water off the top, or by simply reaching into the vessel and removing the precipitate by hand. Excess water may be removed by squeezing or pressing the filled acrylate polymer. In this system, water acts as a plasticizer to soften the filled polymer. If all the water is removed from the filled polymer, a hard plaster-like material is produced which may be resoftened to the original properties by soaking in water. Water or solutions of water and water miscible alcohols, such as methanol, ethanol, propanol, or isopropanol, or water miscible ketones, such as methylketone are suitable liquid vehicles for the reaction and plasticization.

In addition to water or aqueous solutions of alcohols or ketones, plasticizers, emulsified polymers, or surface active agents may be added to the reactor prior to polymerization to assist in the processing and to modify the properties of the final product. Plasticizers such as the aliphatic, phosphates, adipates, sebacates, phthalyls, and glycolates may be pre-emulsified in water and added to the reactor when a modified final product is desired. Examples of a very few, but certainly not all, plasticizers are diisocytyl adipate, butyl octyl phthalate, dibutyl sebacate, tricresyl phosphate, and butyl glycolate. Emulsified polymers may be incorporated in the prepolymerized mixture when final properties of the product are to be modified. Polyvinylchloride, styrene-butadiene rubber, and emulsified organic esters, such as methyl methacrylate are a few examples of suitable emulsified polymers which may be used. Where processing is assisted by wetting of the filler to prevent conglomeration of the particles surface active agents, such as soaps or detergents, may be added to the initial charge in the reactor.

Monomeric acrylic acid is preferred for most applications of this, mainly for reasons of economics. It should be understood, however, substituted acrylic acids, such as methacrylic acid, $\beta$-propylacrylic acid, $\alpha$-chloroacrylic acid, $\beta$-chloroacrylic acid, or $\beta$-vinylacrylic acid to illustrate a few, are equally as suitable.

The filler material may be selected from any of several polyvalent metal carbonates. Although calcium carbonate is preferred strictly from an economic standpoint, zinc carbonate, cadmium carbonate, cobalt carbonate, copper carbonate, magnesium carbonate, strontium carbonate, barium carbonate, lead carbonate, nickel carbonate, iron carbonate, or manganese carbonate will work equally as well. Product properties also are dependent upon the particle size as well as on the amount of carbonate used as filler. Thus, for systems of equal end properties, coarse particle sizes will require more carbonate on a molar basis than will finer particle sizes. Finer particles have a higher surface-area-to-weight ratio and thus provide more reinforcement. Normally, particle sizes ranging from 7 microns to 44 microns have been found to be most suitable. The amount of carbonate which can be used has been found to range from 1 mole of carbonate per mole of the acrylic acid to 25 moles of carbonate per mole of the monomeric acrylic acid. There is a change in the properties produced by this wide range of filler material. In amounts of 1 mole to 8 moles of carbonate per mole of the acrylic acid, a moldable elastomer is obtained, while in amounts ranging from 8 moles to 25 moles per mole of the monomeric acrylic acid, a moldable clay is obtained.

Catalysts used to polymerize the filled monomer of this invention are of the free radical type. Suitable catalysts may be selected from ammonium persulfate, potassium persulfate, sodium persulfate, tertiary butyl peroxide, dicumyl peroxide, cumene hydroperoxide, tertiary butyl perbenzoate, acetyl peroxide, lauroyl peroxide, and methyl ethyl ketone peroxide. The proportions in which these peroxides may be used range from 0.1 to 2% by weight of the acrylic acid used.

The following example will illustrate one specific embodiment of the present invention and should not be considered as a limitation hereof.

EXAMPLE

Approximately 1500 milliliters of distilled water and 675.69 grams of reagent grade calcium carbonate was added to a 4 liter resin kettle. The resin kettle was then fitted with a mixer, a reflux condenser, and a thermometer. After stirring was commenced 54.09 grams of glacial acrylic acid was slowly added to the calcium carbonate slurry. Next, 6.76 grams of a non-ionic surfactant comprising a 28% solid of sodium salt of alkyl-aryl polyether sufonate in water (Triton X200, Rohm and Hass) was added to the mixture and the contents were brought to a boil (104° C) and held at reflux for approximately 10 minutes. Ammonium persulfate in the amount of 0.6 grams was added to the reaction vessel and heating was continued for 10 minutes, after which heating and stirring was terminated. The contents of the reaction vessel was cooled then to room temperature by placing the reaction vessel in an ice bath. A white coalesced, dough-like material precipitated and was washed twice under cold tap water.

The filled acrylate polymers of this invention can be used in a multiplicity of ways where clay or plaster materials may be used. As a toy, these non-toxic, non-staining polymers may be plasticized with water and used as a modeling clay. As a dry molding powder, the elastomeric composition will fuse into the shape of the mold upon the addition of water. If a colored molding powder is desired, a water insoluble, nontoxic dye or pigment may be added during the initial mixing. Examples of some of the suitable dyes are ultramarine blue, phthalocyanine blue, phthalocyanine green, quinacridone red, and quinacridone orange.

Where load bearing structural parts are made from the filled polymetal acrylate, short reinforcing fibers of cotton, rayon, nylon, dacron, or other synthetic fibers may be added into the initial charge of ingredients. With the addition of reinforcing fibers to the filled polymetal acrylate material, orthopedic castings can be made in a manner similar to that of plaster of paris. The advantage of the material of this invention over plaster of paris is that removal of casts is greatly facilitated. Plaster casts must be broken or sawed apart while materials of this invention may be softened in water and then removed by scissors or by hand tearing.

A further use of the materials of this invention is their use as molds or forms in plastics and metal shape fabrication. Molds or forms from the dry, hard state of these materials allow metal and plastic castings to be made with the resultant easy removal of the form or mold by softening with water following hardening of the metal or plastic. Other plastic fabrication techniques such as laminating, filament winding and molding can take advantage of forms and molds in the same way.

We claim:
1. A method of making moldable filled polymetal acrylates comprising:
    A. adding a monomeric organic acid selected from the group consisting of acrylic acid, methacrylic acid, β-propylacrylic acid, α-chloracrylic acid, β-chloracrylic acid, β-vinylacrylic acid to a predominant amount of a polyvalent metal carbonate in a stirred aqueous slurry, said carbonate in a molar ratio range of from 25 to 1 for each mole of acid;
    B. heating the mixture formed to its boiling point;
    C. adding a free radical catalyst;
    D. cooling said mixture whereupon particles precipitate; and
    E. removing the precipitated particles.

2. A method according to claim 1, wherein the polyvalent metal carbonate is selected from the group consisting of calcium carbonate, magnesium carbonate, strontium carbonate, barium carbonate, manganese carbonate, zinc carbonate, cadmium carbonate, cobalt carbonate, copper carbonate, nickel carbonate, lead carbonate, and iron carbonate.

3. A method according to claim 1, wherein the free radical catalyst is selected from the group consisting of ammonium persulfate, potassium persulfate, sodium persulfate, tertiary butyl peroxide, dicumyl peroxide, cumene hydroperoxide, tertiary butyl perbenzoate, acetyl peroxide, lauroyl peroxide, and methyl ethyl ketone peroxide.

4. A method according to claim 1 wherein a water insoluble dye selected from the group consisting of ultramarine blue, phthalocyanine blue, phthalocyanine green, quinacridone red, and quinacridone orange is added to the stirred aqueous slurry.

5. A method according to claim 1 wherein a plasticizer selected from the group consisting of aliphatic phthalate, aliphatic sebacate, aliphatic adipate, aliphatic phosphate, and aliphatic glycolate, is added to the stirred aqueous slurry.

* * * * *

UNITED STATES PATENT OFFICE
CERTIFICATE OF CORRECTION

PATENT NO. : 3,992,348
DATED : November 16, 1976
INVENTOR(S) : John F. Jones et al It is certified that error appears in the above-identified patent and that said Letters Patent are hereby corrected as shown below:

Column 2, line 14, after "aliphatic" and before the "comma" insert --phthalates--

Column 2, lines 14 and 15, delete "phthalyls"

Column 2, line 27, after "particles" insert --,--

Column 3, line 16, change "sufonate" to --sulfonate--

Column 4, line 48, after "glycolate" delete the comma

Signed and Sealed this

Fifth Day of April 1977

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,992,348
DATED : November 16, 1976
INVENTOR(S) : John F. Jones et al It is certified that error appears in the above–identified patent and that said Letters Patent are hereby corrected as shown below:

Change Assignee from "TRW Systems & Energy" to --TRW Inc.--

Signed and Sealed this

Seventeenth Day of May 1977

[SEAL]

Attest:

RUTH C. MASON
*Attesting Officer*

C. MARSHALL DANN
*Commissioner of Patents and Trademarks*